(12) United States Patent
Liu

(10) Patent No.: US 7,342,970 B2
(45) Date of Patent: Mar. 11, 2008

(54) ARRAY PROCESSING USING AN AGGREGATE CHANNEL MATRIX GENERATED USING A BLOCK CODE STRUCTURE

(75) Inventor: Jung-Tao Liu, Randolph, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 740 days.

(21) Appl. No.: 10/428,603

(22) Filed: May 2, 2003

(65) Prior Publication Data

US 2004/0218697 A1    Nov. 4, 2004

(51) Int. Cl.
*H04L 27/00*    (2006.01)

(52) U.S. Cl. ............... 375/259; 375/267; 375/347; 375/348

(58) Field of Classification Search ........... 375/267, 375/347, 348
See application file for complete search history.

(56) References Cited

U.S. PATENT DOCUMENTS

| | | | |
|---|---|---|---|
| 6,865,237 B1 * | 3/2005 | Boariu et al. ............ | 375/295 |
| 2001/0017903 A1 * | 8/2001 | Naguib et al. ............ | 375/347 |
| 2003/0026349 A1 * | 2/2003 | Onggosanusi et al. ...... | 375/267 |
| 2003/0103584 A1 * | 6/2003 | Bjerke et al. ............ | 375/340 |

OTHER PUBLICATIONS

Siavash M. Alamouti, "A Simple Transmit Diversity Technique for Wireless Communications," *IEEE Journal on Select Areas in Communications*, vol. 16, No. 8, pp. 1451-1458 (Oct. 1998).

Hamid Jafarkhani, "A Quasi-Orthogonal Space-Time Block Code," *IEEE WIreless Communications and Networking Conference. Conference Record*, vol. 1, pp. 42-45 (2000).

Olav Tirkkonen et al., "Complex Space-Time Block Codes for Four Tx Antennas," *Globecom '00, IEEE Global Telecommunications Conference*, vol. 2, pp. 1005-1009 (2000).

Olav Tirkkonen et al., "Minimal Non-Orthogonality Rate 1 Space-Time Block Code for 3+ Tx Antennas," *IEEE 6th Int. Symp. On Spread-Spectrum Tech. & Appli.*, NJIT pp. 429-432 (Sep. 6-8, 2000).

Olav Tirkkonen et al., "Square-Matrix Embeddable Space-Time Block Codes for Complex Signal Constellations," *IEEE Transactions on Information Theory*, vol. 48, No. 2, pp. 384-395 (Feb. 2002).

Vahid Tarokh et al., "Space-Time Block Codes from Orthogonal Designs," *IEEE Transactions on Information Theory*, vol. 45, No. 5, pp. 1456-1467 (Jul. 1999).

(Continued)

*Primary Examiner*—Curtis B. Odom

(57) ABSTRACT

A method includes generating a received signal vector from a signal received over a channel. The received signal vector includes a plurality of symbols encoded in accordance with a block code having a structure. A channel matrix estimated for the channel is transformed based on the structure of the block code to generate an aggregate channel matrix. The symbols are processed using the aggregate channel matrix. A system includes a front end unit configured to generate the received signal vector, a channel estimation unit configured to estimate the channel matrix, and a processing unit configured to generate the aggregate channel matrix and process the symbols using the aggregate channel matrix.

18 Claims, 4 Drawing Sheets

OTHER PUBLICATIONS

Vahid Tarokh et al., "Combined Array Processing and Space-Time Coding," *IEEE Transactions on Information Theory*, vol. 45, No. 4, pp. 1121-1128 (May 1999).

Vahid Tarokh et al., "Space-Time Codes for High Data Rate Wireless Communication: Performance Criterion and Code Construction," *IEEE Transactions on Information Theory*, vol. 44, No. 2, pp. 744-765 (Mar. 1998).

P.W. Wolniansky et al., "V-BLAST: An Architecture for Realizing Very High Data Rates Over the Rich-Scattering Wireless Channel," *IEEE*, pp. 295-300 (1998).

I. Emre Telatar, "Capacity of Multi-antenna Gaussian Channels," *AT & T Bell Labs, Internal Tech. Memo*, Jun. 1995.

G. J. Foschini, "Layered Space-Time Architecture For Wireless Communication In A Fading Environment When Using Multi-Element Antennas," *Bell Labs Technical Journal*, 1996.

Gerard J. Foschini et al., "Simplified Processing for High Spectral Efficiency Wireless Communication Employing Multi-Element Arrays," *IEEE Journal on Selected Areas in Communications*, vol. 17, No. 11, pp. 1841-1852 (Nov. 1999).

\* cited by examiner

ARRAY PROCESSING USING AN AGGREGATE CHANNEL MATRIX GENERATED USING A BLOCK CODE STRUCTURE

BACKGROUND OF THE INVENTION

1. Field of the Invention

This invention relates generally to the field of wireless communication using a space-time block coded (STBC) multiple input multiple output (MIMO) scheme and, more particularly, to array processing using an aggregate channel matrix generated using a space-time block code structure.

2. Description of the Related Art

Owners and/or operators of communication networks, i.e., the service providers, are constantly searching for methods and equipment that can meet the changing needs of their subscribers. Subscribers of communication networks, including wireless communication networks, require higher information throughput in order to exploit the expanding range of services being provided by current communication networks. For example, wireless communication subscribers are now able to have simultaneous access to data networks such as the Internet and to telephony networks such as the Public Switched Telephone Network (PSTN). Also, service providers are constantly investigating new techniques that would allow them to increase their information transfer rate.

Information transfer rate is the amount of information, usually measured in bits per second, successfully conveyed over a communication channel. The information transfer rate can be increased in a number of well known manners. One technique is to increase the power of the transmitted signals. A second technique is to expand the frequency range (i.e., bandwidth) over which the communication is established. However, both power and bandwidth are limited by certain entities such as governmental and standards organizations that regulate such factors. In addition, for portable devices, power is limited by battery life.

An approach that circumvents the power and bandwidth limitations is to increase the number of antennas used to transmit and receive communication signals (i.e., employing a multiple input multiple output (MIMO) system). Multiple antenna diversity has been an effective way to combat fading signals in land mobile communication systems. Typically, the antennas are arranged as an array of antennas. One of the main features of MIMO systems is that they benefit from the multipath propagation of radio signals. In a multipath environment, radio waves transmitted by an antenna do not propagate exclusively in straight lines towards the receive antenna. Rather, the radio waves scatter off a multitude of objects that block the direct path of propagation. Thus, the environment creates a multitude of possible paths from transmit to receive antennas. These multiple paths interfere with each other at the location of the receive antenna. This interference process creates a pattern of maxima and minima of received power, with the typical spatial separation between consecutive maxima being approximately one wavelength.

MIMO systems exploit the rich scattering environment, and use multiple transmitters and receivers to create, in effect, a plurality of parallel subchannels each of which carries independent information. For transmitting antennas, the transmitted signals occupy the same bandwidth simultaneously and thus spectral efficiency is roughly proportional to the number of subchannels. For receiving antennas, MIMO systems use a combination of linear and nonlinear detection techniques to disentangle the mutually interfering signals. Theoretically, the richer the scattering, the more subchannels that can be supported.

While MIMO techniques theoretically allow antenna arrays to have relatively high information rates, the actual achieved information transfer rate will greatly depend on how the information is coded in the different subchannels. The information transfer rate of the system increases as the number of antennas in a transmit and/or receive array is increased. However, in many cases the amount of space available for the antenna array is limited. In particular, the space limitation is very critical for portable wireless devices (e.g., cell phones, Personal Digital Assistants (PDAs), and the like). Increasing the number of antennas in an array of limited space decreases the spacing between individual antennas in the array. The reduced spacing between antennas typically causes signal correlation to occur between signals received from different antennas. Signal correlation reduces the gain in information transfer rate obtained by the use of MIMO techniques.

One technique for using antenna arrays in a MIMO implementation is a space-time transmit diversity technique. Space-time transmit diversity (STTD) coding uses two or more transmitting antennas in order to take advantage of both the spatial and temporal diversity of the channel. An array of antennas is typically divided into groups (i.e., spatial diversity) and each group is assigned a plurality of time instances for transmission (i.e., time diversity). Various space-time block coding (STBC) techniques are well-known to those of ordinary skill in the art. Typical space-time block decoding techniques require that all symbols from the same codewords be received before decoding can be performed. As the number of transmit antennas increases, so does the size of the codeword. Accordingly, the wait time required to receive all the codewords prior to decoding increases, resulting in greater latency. Also, longer codewords require greater computational complexity.

The present invention is directed to overcoming, or at least reducing the effects of, one or more of the problems set forth above.

SUMMARY OF THE INVENTION

One aspect of the present invention is seen in a method for processing a signal. The method includes generating a received signal vector from a signal received over a channel. The received signal vector includes a plurality of symbols encoded in accordance with a block code having a structure. A channel matrix estimated for the channel is transformed based on the structure of the block code to generate an aggregate channel matrix. The symbols are processed using the aggregate channel matrix.

Another aspect of the present invention is seen in a system including a front end unit, a channel estimation unit, and a processing unit. The front end unit is configured to receive a signal over a channel and generate a received signal vector from the signal. The received signal vector includes a plurality of symbols encoded in accordance with a block code having a structure. The channel estimation unit is configured to estimate a channel matrix for the channel. The processing unit is configured to receive the received signal vector, transform the channel matrix based on the structure of the block code to generate an aggregate channel matrix, and process the symbols using the aggregate channel matrix.

BRIEF DESCRIPTION OF THE DRAWINGS

The invention may be understood by reference to the following description taken in conjunction with the accompanying drawings, in which like reference numerals identify like elements, and in which.

Figure 1:
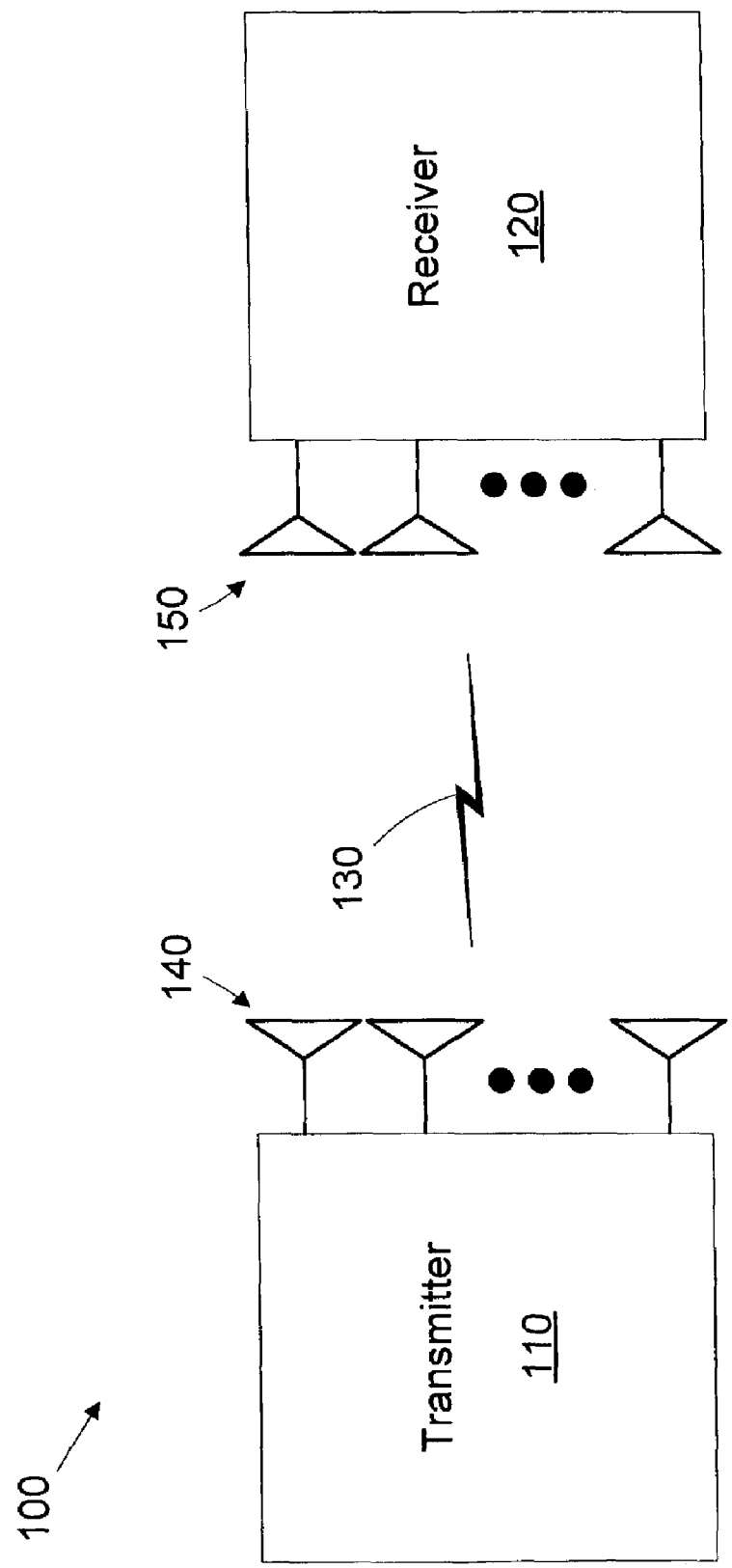
FIG. 1 is a simplified block diagram of a communications system in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
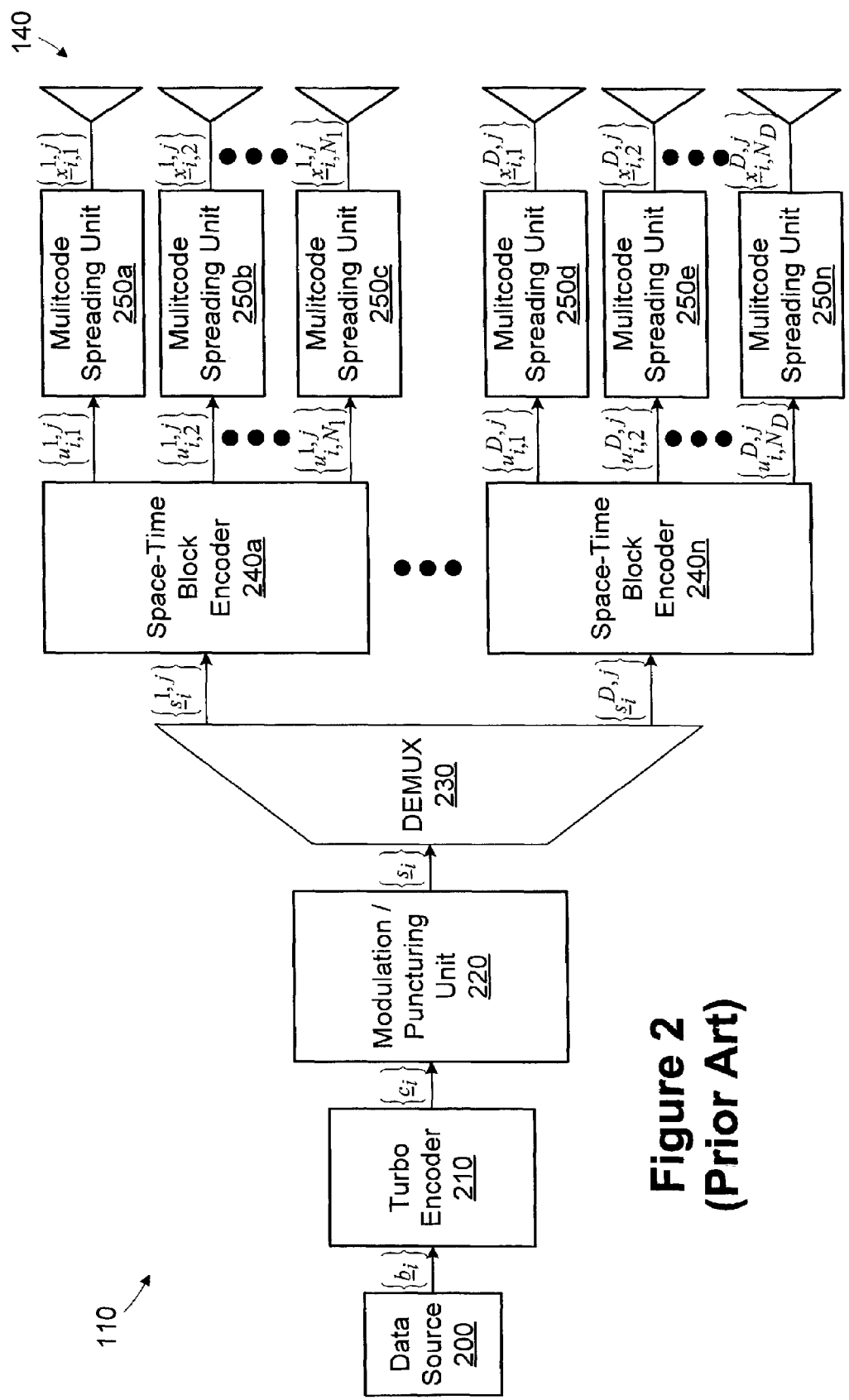
FIG. 2 is a simplified block diagram of a transmitter in the system of FIG. 1.

Referring now to FIG. 1, a simplified block diagram of a communications system 100 in accordance with one embodiment of the present invention is provided. A transmitter 110 communicates with a receiver 120 over a channel 130. The transmitter 110 and receiver 120 employ multiple antennas 140 and 150, respectively. The transmitter 110 is a conventional multicode spread spectrum system. The construct and operation of such a transmitter 110 are well known to those of ordinary skill in the art. FIG. 2 represents a simplified block diagram of the conventional transmitter 110. In the following description, a system model based on the publicly available Universal Mobile Telecommunications System (UMTS) standards is employed. Accordingly, some of the common channel structures, such as the common pilot channel (CPICH), and dedicated pilots for the traffic channel, etc. are employed. Throughout the following description, i represents a time index, j represents an antenna group index, k represents a spreading code index, and l represents an index to the antenna within a given antenna group.

The transmitter 110 is a multicode spread spectrum system with N (>1) transmit antennas 140. A data source 200 generates a sequence of uncorrelated data vectors, denoted by $\{\underline{b}_i\}$, where i is the time index. A turbo encoder 210 produces vectors, $\{\underline{c}_i\}$, which are then punctured (or repeated) and modulated to match a pre-determined data rate in a modulation/puncturing unit 220. The detailed information about the relationship between the data rate, the modulation and the puncturing/repetition depends on the spreading factor, the number of spreading codes available at the time of transmission and the transmission time interval (TTI) for the given transmission. After coding and modulation, the symbol vector sequences, denoted by $\{s_i\}$, are de-multiplexed by a demux unit 230 into subsets for different antenna groups as well as for different spreading codes. The input signals delivered to space-time block encoders 240(a-n) are sequences of vectors that can be written as $\{\underline{s}_i^{j,k}\}$. Each element in the sequence, $\underline{s}_i^{j,k}$, represents an $(N_j * r_j)$ dimensional vector of modulated symbols for the j-th antenna group, k-th spreading code, at time instance i, where $r_j$ is the rate of the space-time code, and $N_j$ is the number of antennas in the j-th antenna group. Note that different kinds of space-time block codes can be used for each antenna group. Also, a space-time trellis code can be used as long as the total number of transmit antennas N is equal to $N_1 + N_2 + \ldots + N_D$. The space-time coded sequences are spread using multicode spreading units 250(a-n) and transmitted over a single frequency channel. The same set of spreading codes are used on all the transmit antennas 140. In the illustrated embodiment, it may be assumed for ease of illustration that a set of orthogonal Walsh codes is used for the spreading codes. Another assumption may be that the channel for any given pair of transmit and receive antennas is one-path i.i.d. Rayleigh faded. As a consequence, the data streams transmitted using different spreading codes will be completely orthogonal at the receiver after the de-spreading. Of course, the invention may be implemented without these assumptions. Again the construct and operation of the units 200, 210, 220, 230, 240, and 250 are well known to those of ordinary skill in the art.

Figure 3:
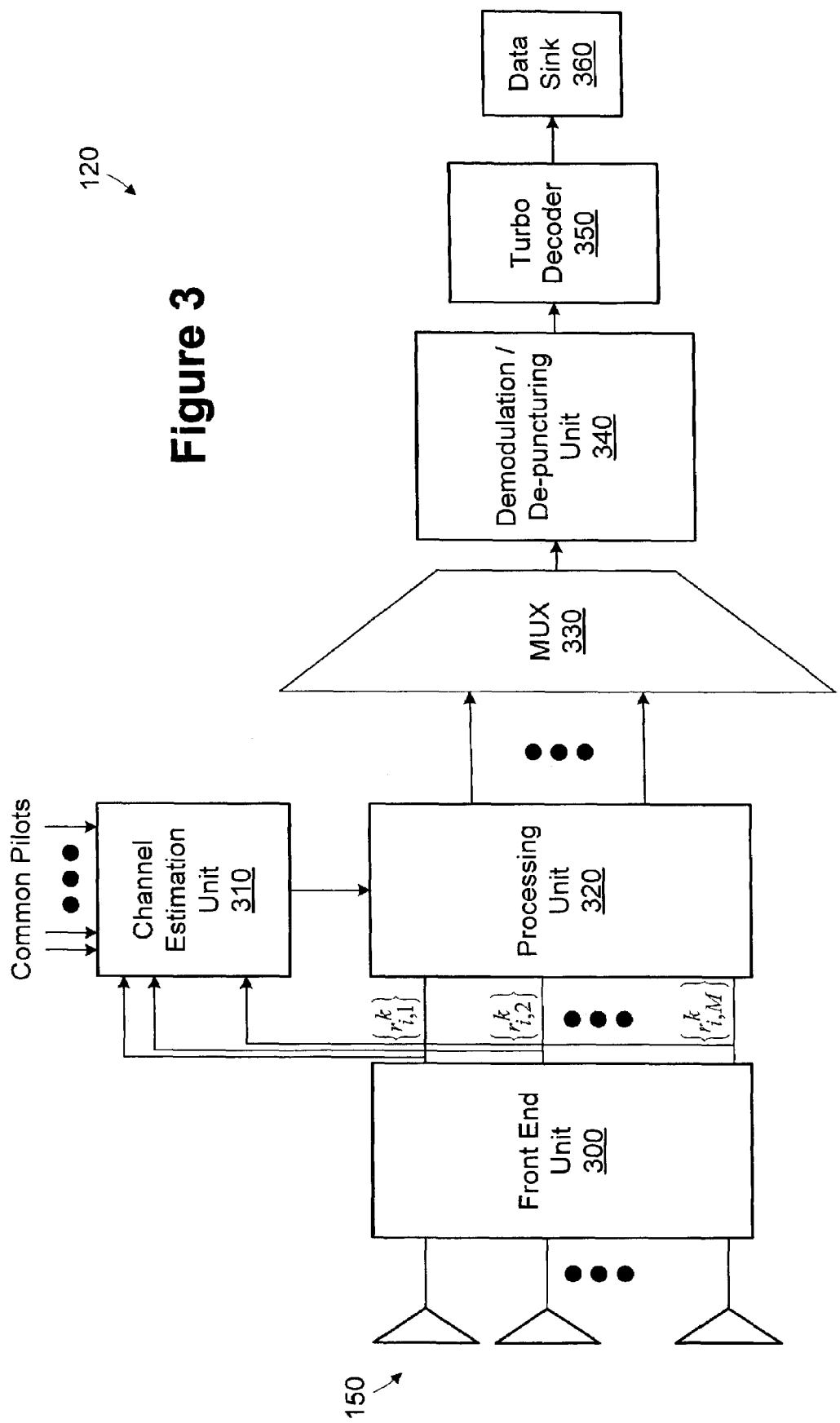
FIG. 3 is a simplified block diagram of a receiver in the system of FIG. 1.

Turning now to FIG. 3, a simplified block diagram of the receiver 120 is provided. A front-end unit 300 performs a conventional mulitcode dispreading operation, well known to those of ordinary skill in the art, to generate a received signal vector for the k-th spreading code at time instance i, after the de-spreading, the received signal vector may be written as:

$$r_i^k = \begin{bmatrix} r_{i,1}^k \\ r_{i,2}^k \\ \vdots \\ r_{i,M}^k \end{bmatrix} = \begin{bmatrix} \sum_{j=1}^{D}\sum_{l=1}^{N_j} h_{l,1}^j(i) u_{i,l}^{j,k} \\ \vdots \\ \sum_{j=1}^{D}\sum_{l=1}^{N_j} h_{l,M}^j(i) u_{i,l}^{j,k} \end{bmatrix} + \begin{bmatrix} n_1 \\ n_2 \\ \vdots \\ n_M \end{bmatrix}, \quad (1)$$

where $h_{l,m}^j(i)$ is the flat Rayleigh fading response between the l-th transmit antenna in the j-th antenna group and the m-th receive antenna at time instance i; $u_{i,l}^{j,k}$ is the complex modulated symbol transmitted over the l-th transmit antenna in the j-th antenna group using the k-th spreading code at time instance i and $E\{u_{i,l}^{j,k}\} \equiv 1$, i.e. the average symbol energy is normalized to one; $n_m$, m=1, 2, . . . , M, is the additive white Gaussian noise. A channel estimation unit 310 generates an instantaneous channel matrix defined by:

$$H(i) = [H_1(i) H_2(i) \ldots H_D(i)], \quad (2)$$

where $H_j(i)$ is a $M \times N_j$ matrix representing the channel response between the j-th antenna group and M receive antennas whose elements are denoted by $[H_j(i)]_{nm} = h_{n,m}^j$. To simply the notation, and to avoid unnecessarily obscuring the instant invention, the time index for each matrix element has been omitted. The operation of the channel estimation unit 310 is conventional and well known to those of ordinary skill in the art.

A processing unit 320 separates codewords from different antenna groups. Different types of space-time block code structures may be chosen for different antenna groups. A system with an arbitrary number of transmit and receive antennas 140, 150 may be constructed. The space-time block code (STBC) chosen in the illustrated embodiment is a simple two transmit antenna diversity technique, however, different STBC structures may be used. Although the invention is described as it may be implemented using a space-time block code, it is contemplated that other types of block codes may be employed, and the invention is not limited to any particular type of block code.

In the illustrated embodiment, it assumed that all space-time codecs use the same block code. For Alamouti code, we have $N_j=2$, $\forall j$ The input to the space-time coder is coded as follows, $$[\underline{u}_i^{j,k} \quad \underline{u}_{i+1}^{j,k}] = \begin{bmatrix} u_{i,1}^{j,k} & u_{i+1,1}^{j,k} \\ u_{i,2}^{j,k} & u_{i+1,2}^{j,k} \end{bmatrix} = \begin{bmatrix} s_i^{j,k} & -(s_{i+1}^{j,k})^* \\ s_{i+1}^{j,k} & (s_i^{j,k})^* \end{bmatrix}, \quad (3)$$

where $i \in \{\text{all even integers}\}$. The received signal vector at time i and i+1, before the processing unit 320 can be expressed as:

$$\underline{r}_i^k = [r_{i,1}^k \ldots r_{i,M}^k]^t = H[\underline{u}_i^{1,k\,t} \ldots \underline{u}_i^{D,k\,t}]^t + \underline{n}_i \quad (4)$$

$$\underline{r}_{i+1}^k = [r_{i+1,1}^k \ldots r_{i+1,M}^k]^t = H[\underline{u}_{i+1}^{1,k\,t} \ldots \underline{u}_{i+1}^{D,k\,t}]^t + \underline{n}_{i+1}. \quad (5)$$

The processing unit 320 defines an aggregate channel matrix by:

$$\overline{H} = \begin{bmatrix} h_{1,1}^1 & h_{2,1}^1 & \cdots & h_{1,1}^D & h_{2,1}^D \\ \vdots & \vdots & \cdots & \vdots & \vdots \\ h_{1,M}^1 & h_{2,M}^1 & \cdots & h_{1,M}^D & h_{2,M}^D \\ (-h_{2,1}^1)^* & (h_{1,1}^1)^* & \cdots & (-h_{2,1}^D)^* & (h_{1,1}^D)^* \\ \vdots & \vdots & \cdots & \vdots & \vdots \\ (-h_{2,M}^1)^* & (h_{1,M}^1)^* & \cdots & (-h_{2,M}^D)^* & (h_{1,M}^D)^* \end{bmatrix} \quad (6)$$

Note that the aggregate channel matrix includes the structure of the space-time block codes used for the different antenna groups. A more detailed example describing how the aggregate channel matrix may be defined based on the space-time block code structures is described in greater detail below.

Combining equations (4), (5), and (6), the processing unit 320 defines an aggregate signal vector as:

$$\tilde{r}_i^k \equiv \begin{bmatrix} r_i^k \\ (r_{i+1}^k)^* \end{bmatrix} = \overline{H} \begin{bmatrix} \underline{u}_i^{1,k} \\ \vdots \\ \underline{u}_i^{D,k} \end{bmatrix} + \begin{bmatrix} \underline{n}_i \\ \underline{n}_{i+1} \end{bmatrix}. \quad (7)$$

Note that by rewriting the receive signal vector as an aggregate signal vector, the receive signal dimension is effectively increased by two fold (i.e., in this example with Alamouti code). Equivalently, the aggregate channel matrix has twice as many rows as the original channel matrix. The performance of the array processing functions performed by the processing unit 320 improves as the number of taps increases. Also, the aggregate signal vector includes multiple time instances (i.e., all of the time instances in the space-time block code structure). Hence, the array processing and space-time block decoding may be performed concurrently.

The processing unit 320 performs an array processing function to separate codewords from different antenna groups. Two conventional techniques for the array processing function are the zero forcing and minimum mean squared error (MMSE) approaches. The discussion below indicates how these techniques may be applied using the aggregate channel matrix and aggregate received signal vector of the present invention. Successive interference cancellation may be used to improve the performance. After received signals for each antenna group are decoded, the estimated symbols are re-coded and cancelled from the received signal vector before the array processing is carried out for the next antenna group. Further improvement may be obtained if channel quality information to be calculated at the receiver can be fed back to the transmitter. Array processing with successive cancellation is closely tied to the space-time code chosen for each antenna group.

The zero forcing approach treats all other signals as interference and aims at completely nulling the other signals while decoding the target antenna group. This can be done by computing the null space of the following matrix:

$$\tilde{H}_j = [\overline{H}_1 \ldots \overline{H}_{j-1} \overline{H}_{j+1} \ldots \overline{H}_D] = \overline{H} \backslash \overline{H}_j. \quad (8)$$

Note that the time index for each matrix has been dropped. Post-multiplying the null space of $\tilde{H}_j$, denoted by $\Psi_j$, by the received signal vector from Equation (7), generates:

$$\tilde{r}_i^{j,k} = \Psi_j \overline{H} \underline{u}_i^k + \Psi_j \underline{n}_i = \Psi_j \overline{H}_j \underline{u}_i^{j,k} + \tilde{n}_i^j, \quad (9)$$

where $\tilde{r}_i^{j,k}$ is the received signal vector after array processing; $\underline{u}_k = [(\underline{u}_i^{1,k})^t, \ldots, (\underline{u}_i^{D,k})^t]^t$ is the symbol vector; and $\underline{u}_i^{j,k} = [u_{i,1}^{j,k}, \ldots, u_{i,N_j}^{j,k}]^t$ is the symbol vector for the j-th antenna group. To ensure that the null space exists for all D antenna groups, we assume that $M \geq N-N_j+1$, $\forall j$. Note that $\tilde{r}_i^{j,k}$ contains only information regarding $\underline{u}_i^{j,k}$ and there is no interference from other antenna groups, and the noise vector $\tilde{n}_i^j$ is, in general, correlated.

The zero forcing approach described above introduces significant noise amplification when the channel matrix is not sufficiently conditioned. The MMSE approach finds a balance between striking out the interferences and increasing the noise. After de-spreading, the received signal vector is pre-multiplied by the MMSE space-time filter $F_j$ that is selected to minimize the mean square error at the filter output with j-th antenna group as the target, i.e.

$$F_j = \min_F E\{(F r_i^k - \underline{u}_i^{j,k})^2\}, \forall j = 1, 2, \ldots, D. \quad (10)$$

The optimal filter for the j-th antenna group is given by:

$$F_j = \overline{H}_j^H \left(\frac{1}{\rho} I + \overline{H} \overline{H}^H\right)^{-1}, \forall j = 1, 2, \ldots, D, \quad (11)$$

where the superscript H represents the Hermitian transpose of a complex matrix, and $\rho$ is the average transmitted signal-to-noise ratio for each antenna, assuming that the total transmit power is evenly distributed across all the transmit antennas. The output of the filter can then be written as:

$$\hat{r}_i^{j,k} = F_j \overline{H} \underline{u}_i^k + F_j \underline{n}_i = \overline{H}_j^H \left(\frac{1}{\rho}I + \overline{HH}^H\right)^{-1} \overline{H} \underline{u}_i^k + \overline{n}_i^j. \quad (12)$$

Note that in the output vector $\hat{r}_i^{j,k}$ is a linear combination of all N transmitted symbols.

The processing unit 320 considers array processing and successive cancellation together. Under the zero forcing approach, combining Equations (8), (9), and (12) and assuming Alamouti code for all antenna groups yields the following equation for the signals out of the array processing function for the first antenna group:

$$\hat{r}_i^{1,k} = \Psi_1 \tilde{r}_i^k = \Psi_1 \overline{H}_1 \begin{bmatrix} s_i^{1,k} \\ s_{i+1}^{1,k} \end{bmatrix} + \Psi_1 \begin{bmatrix} n_i \\ n_{i+1} \end{bmatrix}. \quad (13)$$

Equation (13) is then used to generate soft metrics for turbo decoding (i.e., described in greater detail below) as follows:

$$\left| \hat{r}_i^{1,k} - \Psi_1 \overline{H}_1 \begin{bmatrix} \hat{s}_i^{1,k} \\ \hat{s}_{i+1}^{1,k} \end{bmatrix} \right|^2, \quad (14)$$

where $\hat{s}_i^{1,k}$, $\hat{s}_{i+1}^{1,k}$ represent all possible points in the signal constellation. Therefore, if both symbols are quadrature phase shift keying (QPSK) modulated, there are 16 soft metrics to compute for turbo decoding.

After the first antenna group is decoded, the tentative decisions are obtained by finding the pair of $(s_i^{1,k}, s_{i+1}^{1,k})^t$ that minimizes Equation (14). The contribution from the first antenna group is then subtracted from the aggregate received signal vector given by Equation (7) to obtain:

$$\tilde{r}_i^{2,k} \equiv \begin{bmatrix} r_i^k \\ (r_{i+1}^k)^* \end{bmatrix} - \overline{H}_1 \begin{bmatrix} s_i^{1,k} \\ s_{i+1}^{1,k} \end{bmatrix} = \overline{H}_2^c \begin{bmatrix} s_i^{2,k} \\ s_{i+1}^{2,k} \\ \vdots \\ s_i^{D,k} \\ s_{i+1}^{D,k} \end{bmatrix} + \begin{bmatrix} n_i \\ n_{i+1} \end{bmatrix}, \quad (15)$$

where $\overline{H}_j^c \equiv \overline{H} \setminus \{\overline{H}_1 \cup \ldots \cup \overline{H}_{j-1}\}$. The successive decoding and interference cancellation are done as follows: use Equation (15) to cancel the contribution of the detected symbols from the aggregate signal vector; compute the array processor for the next antenna group, i.e. $\Psi_2$, which is equal to the null space of $\overline{H}_2^c$; replace $\Psi_1$, $\overline{H}_1$, and $\tilde{r}_i^k$ in Equation (13) with $\Psi_2$, $\overline{H}_2^c$, and $\tilde{r}_i^{2,k}$ from Equation (15); use Equation (14) to obtain the soft values for group 2; and repeat the process to decode the next antenna group until all D antenna groups are processed.

For the MMSE approach, Equation (13) should be modified according to Equation (12), which gives the following expression:

$$\hat{r}_i^{1,k} = F_1 \overline{H} \begin{bmatrix} s_i^{1,k} \\ s_{i+1}^{1,k} \\ \vdots \\ s_i^{D,k} \\ s_{i+1}^{D,k} \end{bmatrix} + F_1 \begin{bmatrix} n_i \\ n_{i+1} \end{bmatrix}. \quad (16)$$

The soft metrics for turbo decoding can be computed as:

$$\left| \hat{r}_i^{1,k} - F_1 \overline{H}_1 \begin{bmatrix} \hat{s}_i^{1,k} \\ \hat{s}_{i+1}^{1,k} \end{bmatrix} \right|^2, \quad (17)$$

where $\hat{s}_i^{1,k}$, $\hat{s}_{i+1}^{1,k}$ represent all possible points in the signal constellation and $\overline{H}_1$. The successive decoding and cancellation can then be carried out as follows: use Equation (15) to cancel the contribution of the detected symbol from the aggregate received vector; compute the space-time filter $F_2$ using Equation (11); reduce the signal vector in Equation (16) to $[s_i^{2,k} s_{i+1}^{2,k} \ldots s_i^{D,k} s_{i+1}^{D,k}]^t$ and replace $F_1$, $\overline{H}$ and $\tilde{r}_i^k$ with $F_2$, $\overline{H}_2^c$ and $\tilde{r}_i^{2,k}$ from Equation (15); use Equation (17) to obtain the soft values for the symbols in group 2; and repeat the process to decode the next antenna group until all D antenna groups are processed.

Still referring to FIG. 3, a multiplexer 330 receives the array processed, space-time block decoded output signal from the processing unit 320, a demodulation/de-puncturing unit 340 performs conventional demodulation and de-puncturing processing, a turbo decoder 350 performs conventional turbo decoding processing, albeit using the soft metrics derived from the aggregate channel matrix defined by Equations (14) and (17), and the extracted data is provided to a data sink 360 (i.e., consumer of the data).

Figure 4:
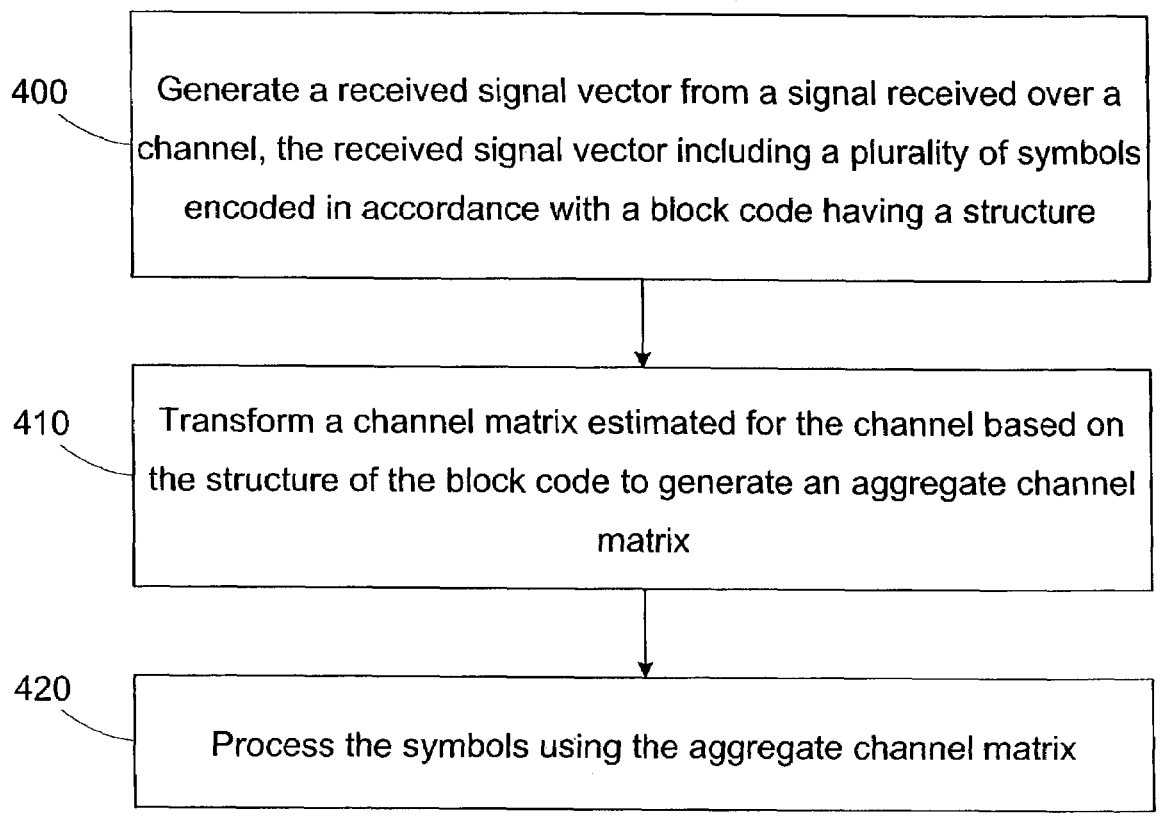
FIG. 4 is a simplified flow diagram of a method for processing a signal in accordance with another illustrative embodiment of the present invention.

The processing unit 320 may be implemented using hardware, software, or a combination of both. The high level operation of the processing unit 320 is described in reference to the simplified flow diagram provided in FIG. 4. In block 400, a received signal vector is generated from a signal received over a channel. The received signal vector includes a plurality of symbols encoded in accordance with a block code having a structure. In block 410, a channel matrix estimated for the channel is transformed based on the structure of the block code to generate an aggregate channel matrix. In block 420, the symbols are processed using the aggregate channel matrix.

The following discussion provides a detailed example of how the channel matrix and received signal vector may be transformed by the processing unit 320 to generate the aggregate channel matrix and aggregate received signal vector. The example assumes a 4-by-2 MIMO system (i.e., 4 transmit antennas, 2 receive antennas). At the transmitter 110, the antennas 140 are grouped into 2 groups each having 2 antennas. For each group, the Alamouti Space-Time Block Code is used to encode the input data sequence.

In a 4-by-2 MIMO system, the channel can be represented by a matrix, conventionally called the channel matrix, as follows:

$$H = \begin{bmatrix} h_{11} & h_{21} & h_{31} & h_{41} \\ h_{12} & h_{22} & h_{32} & h_{42} \end{bmatrix}. \qquad (17)$$

If the channel is assumed to be flat fading, then each of the elements in the channel matrix is scalar, while if the channel is multipath fading, each element would be a vector.

For the 1st antenna group, the transmit signal can be written as:

$$S_1 = \begin{bmatrix} s_1 & -s_2^* \\ s_2 & s_1^* \end{bmatrix}. \qquad (18)$$

Similarly, the transmit signal for the 2nd antenna group can be written as:

$$S_2 = \begin{bmatrix} s_3 & -s_4^* \\ s_4 & s_3^* \end{bmatrix}. \qquad (19)$$

The received signal can be written as:

$$R = H \begin{bmatrix} S_1 \\ S_2 \end{bmatrix} + N, \qquad (20)$$

where N is a noise matrix. Combining Equations 17-20 gives:

$$R = \begin{bmatrix} r_1(t) & r_1(t+1) \\ r_2(t) & r_2(t+1) \end{bmatrix} = \begin{bmatrix} h_{11} & h_{21} & h_{31} & h_{41} \\ h_{12} & h_{22} & h_{32} & h_{42} \end{bmatrix} \begin{bmatrix} s_1 & -s_2^* \\ s_2 & s_1^* \\ s_3 & -s_4^* \\ s_4 & s_3^* \end{bmatrix}, \qquad (21)$$

where $r_1$ and $r_2$ are the received signals at the receive antennas 1 and 2 at time instances t and t+1.

Looking at only the second column of R, we have:

$$\begin{bmatrix} r_1(t+1) \\ r_2(t+1) \end{bmatrix} = \begin{bmatrix} h_{11} & h_{21} & h_{31} & h_{41} \\ h_{12} & h_{22} & h_{32} & h_{42} \end{bmatrix} \begin{bmatrix} -s_2^* \\ s_1^* \\ -s_4^* \\ s_3^* \end{bmatrix}. \qquad (22)$$

To obtain the aggregate channel matrix, first, take the conjugate of Equation (22) to generate:

$$\begin{bmatrix} r_1^*(t+1) \\ r_2^*(t+1) \end{bmatrix} = \begin{bmatrix} h_{11}^* & h_{21}^* & h_{31}^* & h_{41}^* \\ h_{12}^* & h_{22}^* & h_{32}^* & h_{42}^* \end{bmatrix} \begin{bmatrix} -s_2 \\ s_1 \\ -s_4 \\ s_3 \end{bmatrix}. \qquad (23)$$

Next, move the negative from $s_2$ and $s_4$ to the corresponding channel elements to yield:

$$\begin{bmatrix} r_1^*(t+1) \\ r_2^*(t+1) \end{bmatrix} = \begin{bmatrix} -h_{11}^* & h_{21}^* & -h_{31}^* & h_{41}^* \\ -h_{12}^* & h_{22}^* & -h_{32}^* & h_{42}^* \end{bmatrix} \begin{bmatrix} s_2 \\ s_1 \\ s_4 \\ s_3 \end{bmatrix}. \qquad (24)$$

Then, swap rows 1 and 2, and rows 3 and 4 in the right-most signal vector to yield:

$$\begin{bmatrix} r_1^*(t+1) \\ r_2^*(t+1) \end{bmatrix} = \begin{bmatrix} h_{21}^* & -h_{11}^* & h_{41}^* & -h_{31}^* \\ h_{22}^* & -h_{12}^* & h_{42}^* & -h_{32}^* \end{bmatrix} \begin{bmatrix} s_1 \\ s_2 \\ s_3 \\ s_4 \end{bmatrix}. \qquad (25)$$

Note that the columns of the channel matrix are moved together while the rows are swapped in the signal vector.

Finally, a receive signal matrix can be defined to form the aggregated received signal vector R', which can be expressed as:

$$\tilde{R} = \begin{bmatrix} r_1(t) \\ r_2(t) \\ r_1^*(t+1) \\ r_2^*(t+1) \end{bmatrix}. \qquad (26)$$

Equations (21), (25), and (26) are combined to yield:

$$\tilde{R} = \begin{bmatrix} r_1(t) \\ r_2(t) \\ r_1^*(t+1) \\ r_2^*(t+1) \end{bmatrix} = \begin{bmatrix} h_{11} & h_{21} & h_{31} & h_{41} \\ h_{12} & h_{22} & h_{32} & h_{42} \\ h_{21}^* & -h_{11}^* & h_{41}^* & -h_{31}^* \\ h_{22}^* & -h_{12}^* & h_{42}^* & -h_{32}^* \end{bmatrix} \begin{bmatrix} s_1 \\ s_2 \\ s_3 \\ s_4 \end{bmatrix}, \qquad (27)$$

where the aggregate channel matrix is defined as:

$$\overline{H} = \begin{bmatrix} h_{11} & h_{21} & h_{31} & h_{41} \\ h_{12} & h_{22} & h_{32} & h_{42} \\ h_{21}^* & -h_{11}^* & h_{41}^* & -h_{31}^* \\ h_{22}^* & -h_{12}^* & h_{42}^* & -h_{32}^* \end{bmatrix}. \qquad (28)$$

Conventional receivers array process the received signal vectors one at a time. For example, from the definition provided in Equation (21), the $1^{st}$ received vector in the R matrix (i.e., the $1^{st}$ column)

$$\begin{bmatrix} r_1(t) \\ r_2(t) \end{bmatrix} \qquad (29)$$

would be processed together with the channel matrix H of Equation (17). An iterative process would be used without decoding to process the second received signal vector $$\begin{bmatrix} r_1(t+1) \\ r_2(t+1) \end{bmatrix} \quad (30)$$

with the same channel matrix H. After both vectors are processed, the space-time block code is decoded.

The technique employed by the processing unit 320 in the present invention creates the aggregate channel and the aggregate received signal vector, such that it processes two sets of received signals (i.e., at time t and t+1) simultaneously. The decoding of the space-time block code is jointly done with the array processing. By forming the aggregate channel matrix, the degree of freedom is increased two-fold (i.e., in this illustrated example) for the array processing function, which improves the performance of the array processing.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A method, comprising:
   generating a received signal vector from a signal received over a channel, the received signal vector including a plurality of symbols associated with a plurality of antenna groups and encoded in accordance with a plurality of block codes each having a structure and being associated with one of the plurality of antenna groups;
   transforming a channel matrix estimated for the channel based on the structure of each of the block codes to generate an aggregate channel matrix;
   generating a filter based on the aggregate channel matrix;
   decoding symbols associated with a particular antenna group using the filter and the aggregate channel matrix;
   removing a contribution to the received signal vector provided by the symbols associated with the particular antenna group using the aggregate channel matrix;
   updating the aggregate channel matrix to exclude the particular antenna group; and
   iterating the generating, decoding, removing and updating for each of the plurality of antenna groups to decode symbols for each of the antenna groups and extract data from the decoded symbols.

2. The method of claim 1, further comprising generating an aggregate received signal vector based on the received signal vector and the structure of the block code.

3. The method of claim 2, wherein processing the symbols further comprises array processing the symbols based on the aggregate channel matrix and the aggregate received signal vector.

4. The method of claim 3, wherein the block code further comprises an M antenna by N time instance space-time block code, M and N being greater than one, and array processing the symbols further comprises array processing the N time instances simultaneously.

5. The method of claim 2, wherein processing the symbols further comprises array processing and block decoding the symbols jointly based on the aggregate channel matrix and the aggregate received signal vector.

6. The method of claim 5, wherein the block code further comprises an M antenna by N time instance space-time block code, M and N being greater than one, and array processing and decoding the symbols further comprises array processing and space-time block decoding the N time instances simultaneously.

7. The method of claim 1, wherein the extracting and decoding are performed jointly using a minimum mean squared error filter.

8. The method of claim 1, wherein removing the contribution further comprises:
   reconstituting the symbols from the particular antenna group using the aggregate channel matrix; and
   subtracting the reconstituted symbols from the received signal vector.

9. A system, comprising:
   a front end unit configured to receive a signal over a channel and generate a received signal vector from the signal, the received signal vector including a plurality of symbols associated with a plurality of antenna groups and encoded in accordance with a plurality of block codes each having a structure and being associated with one of the plurality of antenna groups;
   a channel estimation unit configured to estimate a channel matrix for the channel; and
   a processing unit configured to receive the received signal vector, transform the channel matrix based on the structure of each of the block codes to generate an aggregate channel matrix, generate a filter based on the aggregate channel matrix, decode symbols associated with a particular antenna group using the filter and the aggregate channel matrix, remove a contribution to the received signal vector provided by the symbols associated with the particular antenna group using the aggregate channel matrix, update the aggregate channel matrix to exclude the particular antenna group, and iterate the generating, decoding, removing, and updating for each of the plurality of antenna groups to decode symbols for each of the antenna groups and extract data from the decoded symbols.

10. The system of claim 9, wherein the processing unit is further configured to generate an aggregate received signal vector based on the received signal vector and the structure of the block code.

11. The system of claim 10, wherein the processing unit is further configured to array process the symbols based on the aggregate channel matrix and the aggregate received signal vector.

12. The system of claim 11, wherein the block code further comprises an M antenna group by N time instance space-time block code, M and N being greater than one, and the processing unit is further configured to array process the N time instances simultaneously.

13. The system of claim 10, wherein the processing unit is further configured to array process and block decode the symbols jointly based on the aggregate channel matrix and the aggregate received signal vector.

14. The system of claim 13, wherein the block code further comprises an M antenna group by N time instance space-time block code, M and N being greater than one, and the processing unit is further configured to array process and space-time block decode the N time instances simultaneously.

15. The system of claim 10, wherein the processing unit is operable to use a minimum mean squared error filter to extract the modulated symbols and decode the modulated symbols.

16. The system of claim 9, wherein removing the contribution further comprises:
reconstituting the symbols from the particular antenna group using the aggregate channel matrix; and
subtracting the reconstituted symbols from the received signal vector.

17. A system, comprising:
means for receiving a signal over a channel;
means for generating a received signal vector from the signal, the received signal vector including a plurality of symbols associated with a plurality of antenna groups and encoded in accordance with a plurality of block codes each having a structure and being associated with one of the plurality of antenna groups;
means for estimating a channel matrix for the channel;
means for transforming the channel matrix based on the structure of each of the block codes to generate an aggregate channel matrix;
means for generating a filter based on the aggregate channel matrix;
means for decoding symbols associated with a particular antenna group using the filter and the aggregate channel matrix;
means for removing a contribution to the received signal vector provided by the symbols associated with the particular antenna group using the aggregate channel matrix;
means for updating the aggregate channel matrix to exclude the particular antenna group; and
means for iterating the generating, decoding, removing and updating for each of the plurality of antenna groups to decode symbols for each of the antenna groups and extract data from the decoded symbols.

18. The system of claim 17, further comprising:

means for generating an aggregate received signal vector based on the received signal vector and the structure of the block code; and
means for array processing the symbols based on the aggregate channel matrix and the aggregate received signal vector.

* * * * *